US006431713B1

United States Patent
Phillips

(10) Patent No.: US 6,431,713 B1
(45) Date of Patent: *Aug. 13, 2002

(54) MIRROR ASSEMBLY FOR TRUCKS

(76) Inventor: Edward J. Phillips, 915 E. 68th, Kansas City, MO (US) 64131

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,140

(22) Filed: Apr. 23, 1999

(51) Int. Cl.[7] .................................................. G02B 5/08
(52) U.S. Cl. ........................ 359/850; 359/851; 359/852; 359/854
(58) Field of Search ................................ 359/850, 851, 359/852, 854, 855, 856, 857, 861

(56) References Cited

U.S. PATENT DOCUMENTS

| 4,512,634 A | * | 4/1985 | Stout | 359/850 |
| 4,998,813 A | * | 3/1991 | Reynolds et al. | 359/872 |
| 5,625,500 A | * | 4/1997 | Ackerman | 359/841 |

* cited by examiner

Primary Examiner—Mohammad Sikder
(74) Attorney, Agent, or Firm—Chase Law Firm, L.C.

(57) ABSTRACT

An improved mirror assembly comprises a combination of mirrors at the front corners of the vehicle along with a pair of side mirrors and a mirror at the back of the vehicle. The mirrors are so positioned to eliminate any blind spots along the boundaries of the vehicle while enhancing the lines of sight therealong, particularly for objects along the front and rear of the vehicle. The mirrors associated with these latter zones are positioned so as to be adjacent the driver to preclude obstruction by packages stacked in the vehicle.

4 Claims, 3 Drawing Sheets

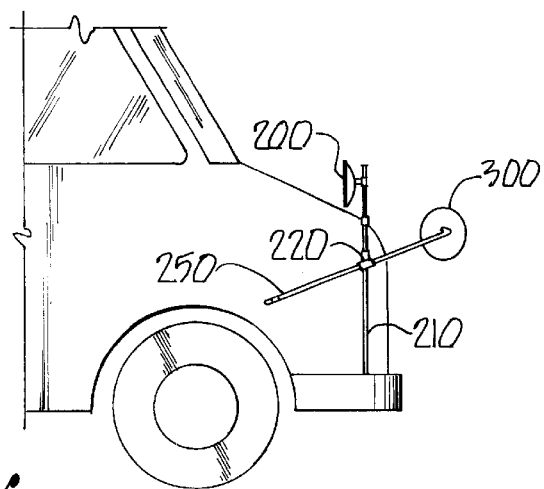
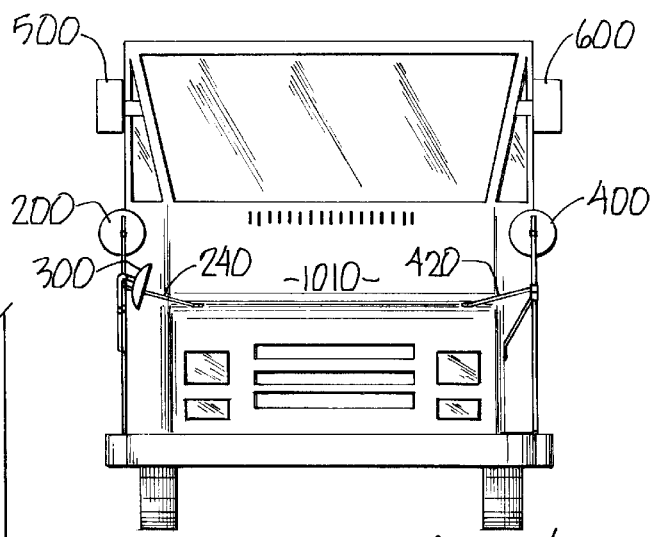
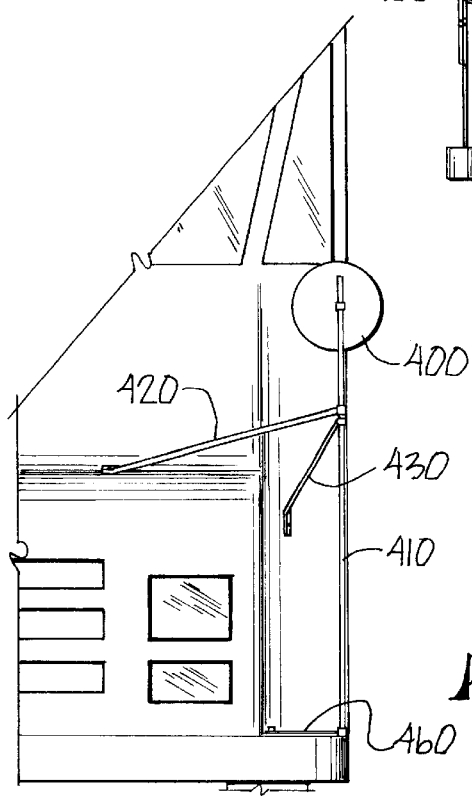

MIRROR ASSEMBLY FOR TRUCKS

BACKGROUND OF THE INVENTION

This invention is directed to a mirror assembly for vehicles and, more particularly, to an improved mirror assembly which allows a driver of a vehicle to ascertain the presence of objects located along all boundaries of the vehicle.

Heretofore, particularly in vehicles in which the driver is positioned on the right side thereof, e.g., postal vehicles or the like, indirect/obstructed lines of sight appear along the boundaries of the vehicle. This is particularly true if packages stacked within the vehicle obstruct the driver's line of sight to an outside side mirror. These obstructions preclude the driver from using the side mirror to ascertain the approach of vehicles along the side of the truck opposite the driver. Thus, the vehicle upon entering traffic was subject to accidents or the like. Moreover, past mirror assemblies did not provide for as direct a line of sight as possible in all directions, particularly along the back and front ends of the truck. In response thereto, I have provided a mirror assembly which addresses these problems and enhances the lines of sight along the back, front and sides of the vehicle.

It is therefor an object of the invention to provide an improved mirror assembly wherein the truck driver will have improved lines of sight along all sides of the truck proper.

Another object of this invention is to provide a mirror assembly, as aforesaid, wherein the truck driver on the right side of the truck, such as a postal vehicle, will have enhanced views along all boundaries of the truck.

Another object of this invention is to provide a mirror assembly, as aforesaid, which is efficient in use and easy to mount to any type of truck.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3 is a front side view of a vehicle showing the front mirror assembly on the driver's side thereof;

FIG. 4 is a front view of a vehicle showing the front mirror assembly on the front corner of the vehicle opposite the drivers side;

FIG. 5 is a close-up view of the front mirror assembly of FIG. 4.

DESCRIPTION OF THE PREFERRED EMBODIMENT

Figure 2:
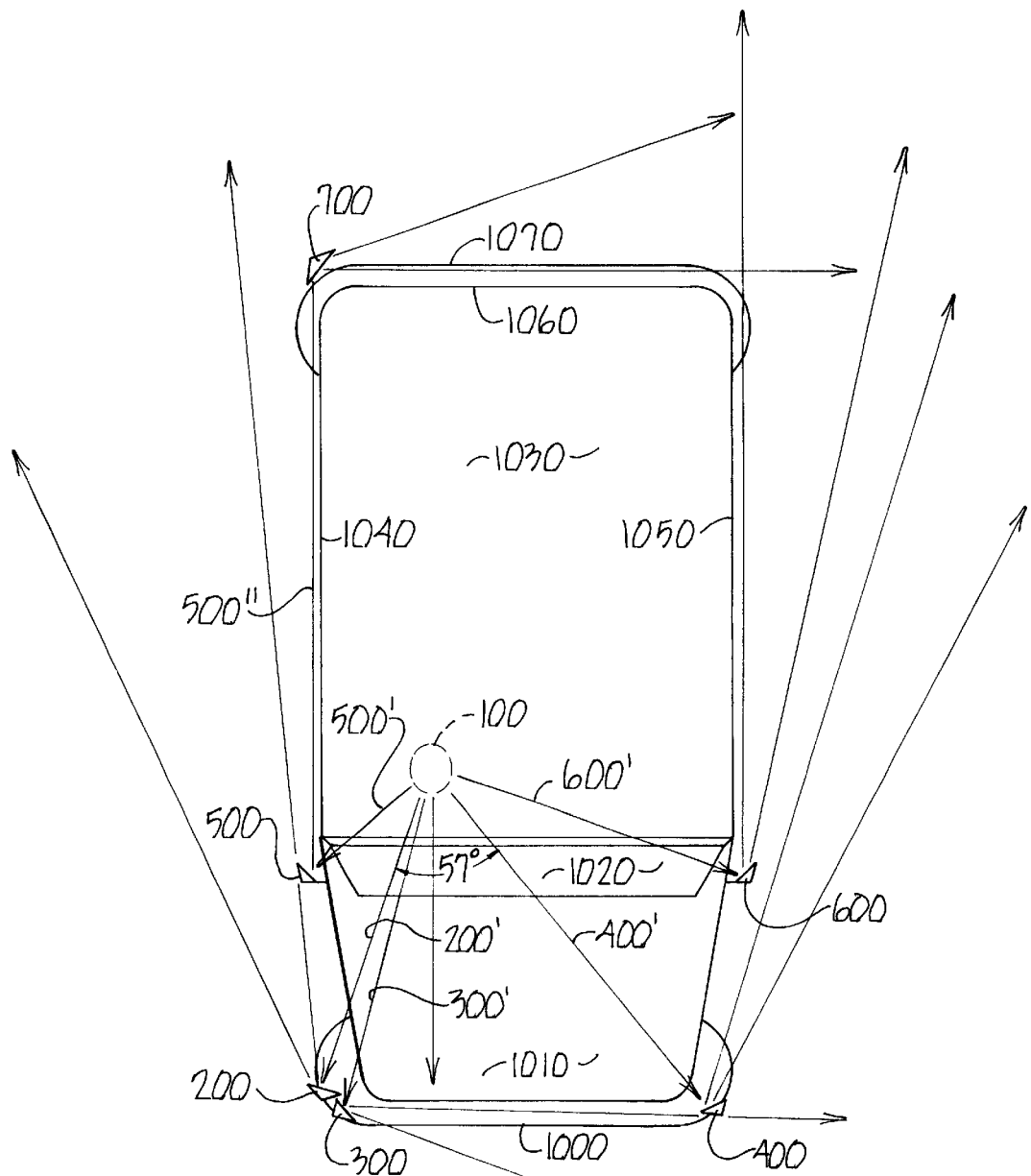
FIG. 2 is a diagrammatic view of the improved mirror assembly.

Turning more particularly to the drawings, FIG. 2 shows a diagrammatic view of the vehicle having a front bumper 1000, hood 1010, windshield 1020, top 1030, sides 1040, 1050, back wall 1060 and rear bumper 1070. The driver 100 is shown as positioned on the right side 1040 vehicle such as found in postal delivery vehicles or the like. Along the front bumper 1000 of the vehicle on the driver side thereof is mounted first 200 and second mirrors 300 (FIG. 3) which are adjustable for viewing by the driver along sight lines 200', 300'. As shown in FIG. 3, the dual mirror assembly 200, 300 is mounted on the front bumper 1000 of the truck at the corner thereof. The mounting assembly includes a braced 240 upstanding rod 210 about which mirror 300 is rotatably mounted via a collar 220 extending from rod 250. Thus, mirror 300 can be adjusted by the driver to reflect images along the front of the vehicle and held thereat. Mirror 200 reflects images appearing along the driver's side 1040 of the vehicle. The mirrors' lines of reflection are shown by arrows emanating from each particular mirror 200, 300.

On the opposed side of the vehicle front a mirror 400, as viewed by the driver along sight line 400a, reflects images found along the opposed side 1050 of the vehicle. Mirror 400 is mounted to an upstanding rod 410 having braces 420, 430 extending therefrom. A brace 460 at the lower end further secures the rod 410 to a corner of the bumper 1000 opposite the driver. The ends of the braces have nut/bolt combinations thereon allowing for brace/mirror adjustment.

Adjacent to the windshield 1020 of the vehicle is mounted a mirror 500 on the driver's side thereof and presents a line of sight 500'. This mirror reflects images found immediately adjacent the driver's side 1040 of the vehicle and also images in the rear mirror 700. On the opposed side of the vehicle adjacent the windshield is a mirror 600 (FIG. 4) viewed by driver along sight line 600' which reflects images found along the opposed side 1050 of the vehicle.

At the rear of the vehicle is located a mirror 700, preferably at the upper extent thereof, which reflects images found along the opposed back wall 1060 of the vehicle. Mirror 700 is a conventional mirror mounted in the back wall of the truck to reflect images along the backside thereof. The images reflected in this mirror 700 are viewed by the driver via the mirror 500.

Figure 1:
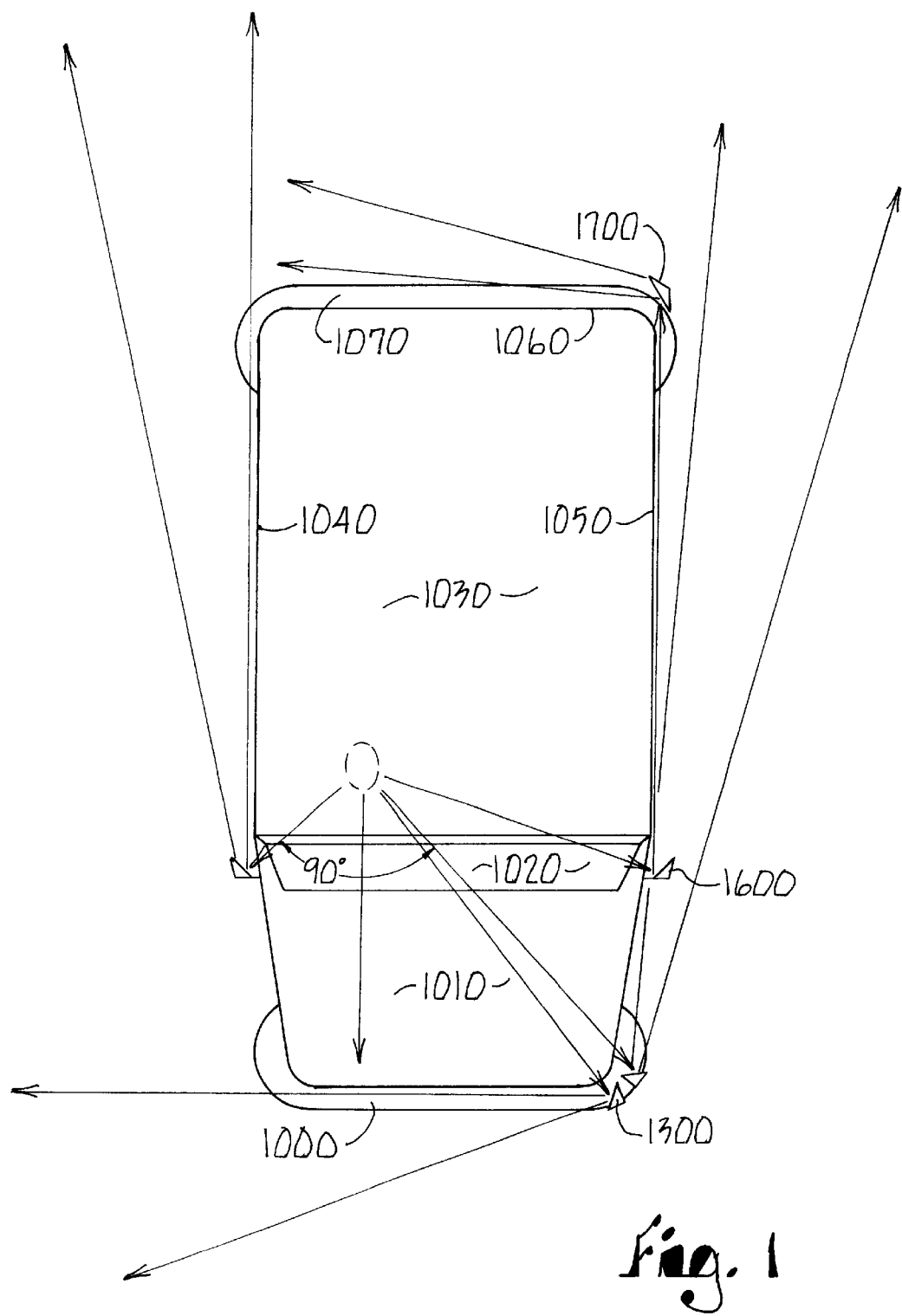
FIG. 1 is a diagrammatic view of a prior art assembly used on a postal-type vehicle.

Accordingly, as shown the lines of sight/fields of vision of the driver of the truck are improved relative to the FIG. 1 assembly as the FIG. 2 mirror assembly reflects images found along all boundaries of the vehicle. As compared to the (FIG. 1) prior art assembly, the ability for the driver to view reflected images along the back side of the vehicle is improved due to the combination of the mirrors 500, 700. In the prior art assembly the driver had to look across the truck interior towards the mirror 600 found on the opposed side 1050 thereof to view images that are reflected in the back mirror 700. These lines of sight could be obstructed by packages stacked in the vehicle or oncoming vehicles. In my improved assembly the lines of sight are improved as the first sight line 500' is immediately adjacent the driver and will not be obstructed by packages stored to the left of the driver. Moreover, as oncoming vehicles will not be found at the curbside 1040 of the parked vehicle, the images in this mirror 500 will not be obstructed. Thus, images along the backside 1060 of the vehicle are more readily viewed via sight lines 500', 500".

Also, the position of the front mirror 300 closer to the driver enables the driver 100 to have a better view across the front side of the vehicle as the line of sight 300' is more direct as opposed to the driver having to view the mirror across the hood as shown in FIG. 1.

Finally, the additional mirror 200 on the driver's side thereof eliminates the blind spot found along the driver's side at the front of the vehicle.

It is to be understood that while certain forms of this invention have been illustrated and described, it is not limited thereto, except in so far as such limitations are included in the following claims.

Having thus described the invention, what is claimed as new and desired to be secured by Letters Patent is:

1. In combination with a right-hand drive vehicle having front and rear ends with left and right sides extending therebetween and presenting left and right front corners and a right rear corner, a mirror assembly for use by a driver which shortens the driver's lines of sight to the mirrors to maximize coverage of each mirror's view comprising:

- a first mirror at said left front corner of said right-hand drive vehicle, said first mirror adapted to reflect images of objects along an area adjacent said left side of the vehicle opposite the driver;
- a second mirror at said right front corner of said vehicle, said second mirror adapted to reflect images of an area along the front of the vehicle;
- a third mirror adjacent said second mirror, said third mirror adapted to reflect images of objects along said right side of said vehicle on the driver's side;
- a fourth flat mirror on the said right side of said vehicle adjacent the driver, said fourth mirror adapted to reflect images immediately adjacent said right side of the vehicle; and
- a fifth mirror at said right rear corner of said vehicle adapted to reflect images of an area along the rear of the vehicle, said fifth mirror images viewable by the driver upon viewing said fourth mirror, wherein said combination of mirrors provides shortened lines of sight along the sides, front and rear of the vehicle to maximize coverage of each mirror's view.

2. The mirror assembly as claimed in claim 1, further comprising a sixth mirror on said left side of the vehicle, said sixth mirror adapted to reflect images immediately adjacent said left side of the vehicle.

3. For use with a vehicle having front and rear ends with a pair of lateral sides extending therebetween, a mirror assembly for driver use comprising:

- a first mirror at a front of the vehicle adjacent a side of a driver, said first mirror adapted to reflect images of objects along the front of the vehicle;
- a second mirror on the side of the vehicle opposite the driver, said second mirror adapted to reflect images adjacent a lateral side of the vehicle opposite the driver;
- a third mirror on the side of the vehicle adjacent the driver, said third mirror adapted to reflect images adjacent a lateral side of the vehicle of the driver;
- a fourth mirror on a back of the vehicle adapted to reflect images along the back thereof, said fourth mirror images viewable by a driver upon viewing said third mirror, wherein said combination of mirrors provides lines of sight along the lateral sides, front and rear of the vehicle.

4. The assembly as claimed in claim 3 wherein the driver is on the right side of the vehicle relative to the front thereof.

* * * * *